310-369 SR

7/26/83 XR 4,395,719

United States Patent [19]

Majewski et al.

[11] 4,395,719

[45] Jul. 26, 1983

[54] INK JET APPARATUS WITH A FLEXIBLE PIEZOELECTRIC MEMBER AND METHOD OF OPERATING SAME

[75] Inventors: Henry A. Majewski, Brookfield; William Salmre, Norwalk; R. Hugh Van Brimer, Southbury, all of Conn.

[73] Assignee: Exxon Research and Engineering Co., Florham Park, N.J.

[21] Appl. No.: 222,573

[22] Filed: Jan. 5, 1981

[51] Int. Cl.[3] .......... G01D 15/16

[52] U.S. Cl. .......... 346/140 R; 310/357; 310/369; 417/322

[58] Field of Search .......... 346/140 R, 75; 310/357, 310/358, 369; 417/322

[56] References Cited

U.S. PATENT DOCUMENTS

| | | | |
|---|---|---|---|
| 3,215,078 | 11/1965 | Stec | 103/1 |
| 3,683,212 | 8/1972 | Zoltan | 310/8.3 |
| 3,781,955 | 1/1974 | Laurinenko | 310/358 X |
| 3,787,884 | 1/1974 | Demer | 346/75 |
| 3,832,579 | 8/1974 | Arndt | 310/8.1 |
| 3,840,758 | 10/1974 | Zoltan | 310/8.1 |
| 3,848,118 | 11/1974 | Rittberg | 239/101 |
| 3,864,696 | 2/1975 | Fischbeck | 346/140 |
| 3,924,974 | 12/1975 | Fischbeck et al. | 417/322 |
| 3,946,398 | 3/1976 | Kyser et al. | 346/1 |
| 3,972,474 | 8/1976 | Keur | 239/102 |
| 4,027,308 | 5/1977 | Fan | 346/75 X |
| 4,068,144 | 1/1978 | Toye | 310/327 |
| 4,115,036 | 9/1978 | Paterson | 417/322 |
| 4,146,899 | 3/1979 | Paranjpe et al. | 346/75 |
| 4,228,440 | 10/1980 | Horike | 346/75 |
| 4,251,824 | 2/1981 | Hara | 346/140 R |

OTHER PUBLICATIONS

NTK Technical Ceramics Bulletin, No. 255.

*Primary Examiner*—Joseph W. Hartary
*Attorney, Agent, or Firm*—Norman L. Norris; Albert W. Preston

[57] ABSTRACT

An ink jet comprises an elastic tubular member (14) characterized by piezoelectric properties. The tubular member (14) is terminated in an orifice (26) adapted to pass droplets of ink when the chamber formed within the tubular member (14) is reduced in size. The piezoelectric properties are provided by a substantially homogeneous mixture of piezoelectric material and an elastic binder.

17 Claims, 6 Drawing Figures

INK JET APPARATUS WITH A FLEXIBLE PIEZOELECTRIC MEMBER AND METHOD OF OPERATING SAME

BACKGROUND OF THE INVENTION

This invention relates to the field of ink jet printers, and more particularly to the field of mechanisms utilized to project ink from orifices.

A. Ink jet apparatus

Typically, ink to be projected from a jet orifice is supplied from an ink reservoir via a conduit an orifice. In such apparatus a portion of that conduit is adapted to impart pressure waves to the ink contained therein. Such pressure waves radiate from this point of application in the conduit towards the orifice to produce the explusion of one or more drops from that orifice. Such pressure waves also radiate towards the reservoir, and, unless absorbed or otherwise caused to decay, may reflect back towards the orifice to interfere with the droplet formation characteristics of subsequent pressure waves created within said conduit portion.

One such conduit-orifice assembly known to the art comprises a relatively rigid, tubular member which is encircled by a suitable transducer, typically comprising a piezoelectric material. The end of the tubular member is terminated in an orifice capable of passing droplets of ink. As the volume within the tubular member changes in response to the energization of the transducer, droplets of ink are projected outwardly through the orifice. Typically, such an ink jet is of the demand type, which means that droplets of ink are only projected from the orifice in response to the energization of the transducer, and the ink supplied to the tubular member is under substantially ambient pressure. U.S. Pat. No. 3,972,474 discloses one such ink jet nozzle wherein such tubular member is a short piece of hypodermic tubing, and the orifice is defined in a jewel fitted to the end of such tubing.

It has also been suggested to provide a piezoelectric transducer which does not surround the conduit portion, but rather is coupled to one surface of a compression "chamber" defined along the ink conduit. See, for example, U.S. Pat. Nos. 3,848,118 and 3,946,398. In U.S. Pat. No. 4,068,144, a hemispherical, piezoelectric crystal is provided which comprises a portion of an ink chamber. The physical dimensions of the component parts of the resulting modulator are made smaller than the half wave-length of the shortest standing acoustical wave that can be established at the highest of the operable drop frequency rates, apparently to separate mechanical resonant frequencies from the operating frequency band.

In U.S. Pat. No. 4,146,899 an orifice plate and the side walls of the reservoir formed above the orifice plate are provided as a unitary construction formed from a thin sheet material. This construction is backed by a member which prevents propagation of various vibrations from the orifice plate along side walls and into the liquid contained in the reservoir.

It has also been suggested to provide, as a portion of the ink jet conduit, a relatively rigid piezoelectric ceramic tube. The piezoelectric properties of this tube are utilized to cause sudden volume changes within the tube to thereby create an acoustic pressure pulse having sufficient amplitude to overcome the surface tension at the orifice, and to eject a small quantity of liquid therefrom. See for example, U.S. Pat. Nos. 3,683,212 (Zoltan) and 3,840,758 (Zoltan). In U.S. Pat. No. 3,683,212, a connecting tube 8, which may be composed of "any suitable metal, such as copper, or stainless steel" is journaled within the interior of the base of the piezoelectric ceramic tube to create a high acoustic impedence due to the length and small bore of that tube relative to the ceramic transducer. Accordingly, a small amount of liquid will be forced back into the small bore tube by comparison to the amount which is expelled at the orifice of the droplet ejecting nozzle.

Another method of damping unwanted pressure waves in the liquid adjacent to the pressure chamber portion of the conduit is to provide damping materials within or around adjacent conduit portions, see U.S. Pat. No. 3,832,579 (Arndt). According to "Arndt", the terminal conduit section 5, which is formed of a material such as a glass having a "smooth internal surface and relatively stiff walls" may be surrounded at several locations with transducers, a first transducer to create a pressure wave within the compression chamber portion of the conduit, and a second transducer located adjacent to the orifice for sensing the magnitude of such waves at location. As explained in U.S. Pat. No. 3,832,579

> "In order for the system to operate as described it is necessary to have a suitable inter-relationship between the properties of the material forming supply conduit section 14, the dimensions of section 14, the inside diameter of conduit section 5, and the properties of liquid 2. If a proper relationship is not established, a pressure wave traveling in the liquid from transducer 17 will be at least partially reflected when it reaches inlet end 7 of section 5. When that reflected wave reaches nozzle 10 it may cause ejection of an additional undesired droplet or may interfere with a desired ejection of a new droplet which happens to be timed to occur as the reflection reaches the nozzle. When the reflected wave reaches the nozzle it will at least partially be reflected back towards the inlet 7, and upon arrival at the inlet 7 this newly reflected wave will be reflected just as the original wave from transducer 17 was reflected. In severe cases of incorrect matching of supply section 14 to section 5 a large number of reflections may thus take place before the energy decreases enough so as not to interfere with ejection of another droplet initiated by a new comman pulse. Thus, the stronger the reflections, the longer the time interval before a new droplet can be ejected without disturbance from the reflecting waves." U.S. Pat. No. 3,832,579, Column 4, lines 22–46.

In order to remedy the problem of reflected waves, U.S. Pat. No. 3,832,579 suggests that an energy absorbing means be coupled to the liquid and be adapted to absorb substantially all of the energy of the pressure wave which was generated by the transducer which is traveling away from the glass transducer conduit section (and towards the reservoir). Energy absorbing means suggested for this purpose include conduit walls upstream from the transducer composed of visco-elastic materials which deform under the influence of the pressure waves, and several forms of acoustic resistance elements located within the conduit at the inlet end of the "reflection-free" section.

Thus, as seen from the above, numerous practioners in the art have attempted to eliminate interferences and irregularities in pressure waves generated within an ink fluid to be jetted. Since such interferences and irregularities directly effect the size and shape of droplets emitted from an ink jet nozzle, the electrostatic behavior of such droplets, and ultimately the quality of print produced by the ink jet apparatus; their elimination leads to an improved ink jet apparatus.

B. Piezoelectric materials

In addition to the piezoelectric materials discussed above, other piezoelectric materials are known which comprise composites made of piezoceramic (P.Z.T.) and synthetic polymer. Such sheets are typically flexible and elastic. They comprise piezoceramic crystals which are dispersed isotropically among synthetic polymer and are claimed to show no piezoelectric deterioration after $10^7$ test cycles. Such sheets are available as composite of piezoceramic crystals and thermo-plastic high molecular resin or composites of piezoceramic crystals and rubber. Piezoelectric sheets of this type are available from N.T.K. Technical Ceramics and comprise the technical specifications set forth in table 1:

ners which can produce bubbles, and undesired pressure wave reflective surfaces.

It is a further object of the present invention to provide an ink jet conduit which is substantially inert to ink.

A further object of the present invention is the provision of an ink jet capable of reliably generating uniform ink jet droplets in spite of ink variations, such as temperature, viscosity, surface tension, and supply pressure, which might otherwise effect the characteristics of the droplets to be formed.

TABLE I

| NTK Piezo-sheet | | Density $10^3$ kg/m$^3$ | Elastic Stiffness $10^{10}$N/m$^2$ | Tensile Strength kg/cm$^2$ | Volume Resistivity Ω-cm | Dielectric Constant (ε/εo) | Piezoelec Const. d31 $10^{-12}$m/V | Piezoelec Const. g31 $10^{-3}$V-m/N | Coupling Factor $k_{31}$ (%) | Thickness (μm) |
|---|---|---|---|---|---|---|---|---|---|---|
| Piezo- | 106 | 5.3 | 1.1 | — | $>10^{13}$ | 85 | 50 | 66 | 19 | 50 |
| Film | 109 | 5.3 | 1.1 | — | $>10^{13}$ | 95 | 55 | 65 | 20 | 20 |
| Piezo- | 110 | 5.6 | 0.0037 | 45 | $>10^{13}$ | 55 | 35 | 70 | — | 500 |
| Rubber | 301 | 4.8 | 0.0055 | 45 | $>10^{13}$ | 30 | 35 | 150 | — | 300 |

SUMMARY OF THE INVENTION

The present invention provides an ink jet nozzle comprising a continuous reservoir-to-orifice ink conduit for delivering ink to be jetted. This conduit comprises a substantially flexible, elastomeric member characterized by electromechanical transducer properties which may be achieved by dispersing piezoelectric crystals in said tubular member. Preferably, this flexible member has a plurality of electrodes defined along its outer surface for selectively creating transient, "peristaltic" constrictions in such member to generate and reinforce desired pressure waves as they advance towards the jetting orifice. This conduit also permits and facilitates the destruction of undesired pressure waves traveling towards the reservoir, to thereby prevent or reduce the likelihood that reflection of such waves may interfere with the characteristics of subsequent, droplet-producing primary waves. Accordingly, permanent constrictions or other energy absorbing means in the upstream portion of the ink jet supply conduit are not needed.

In accordance with alternate embodiments of the present invention, such electrode regions are defined along the flexible member which are used to selectively sense the propagation of waves within said conduit, and to cause responsive transient constrictions in a portion of that member to selectively reduce, increase or alter the shape and amplitude of such waves.

Accordingly, it is a primary object of the present invention to provide an ink jet which is easily fabricated.

Figure 6:
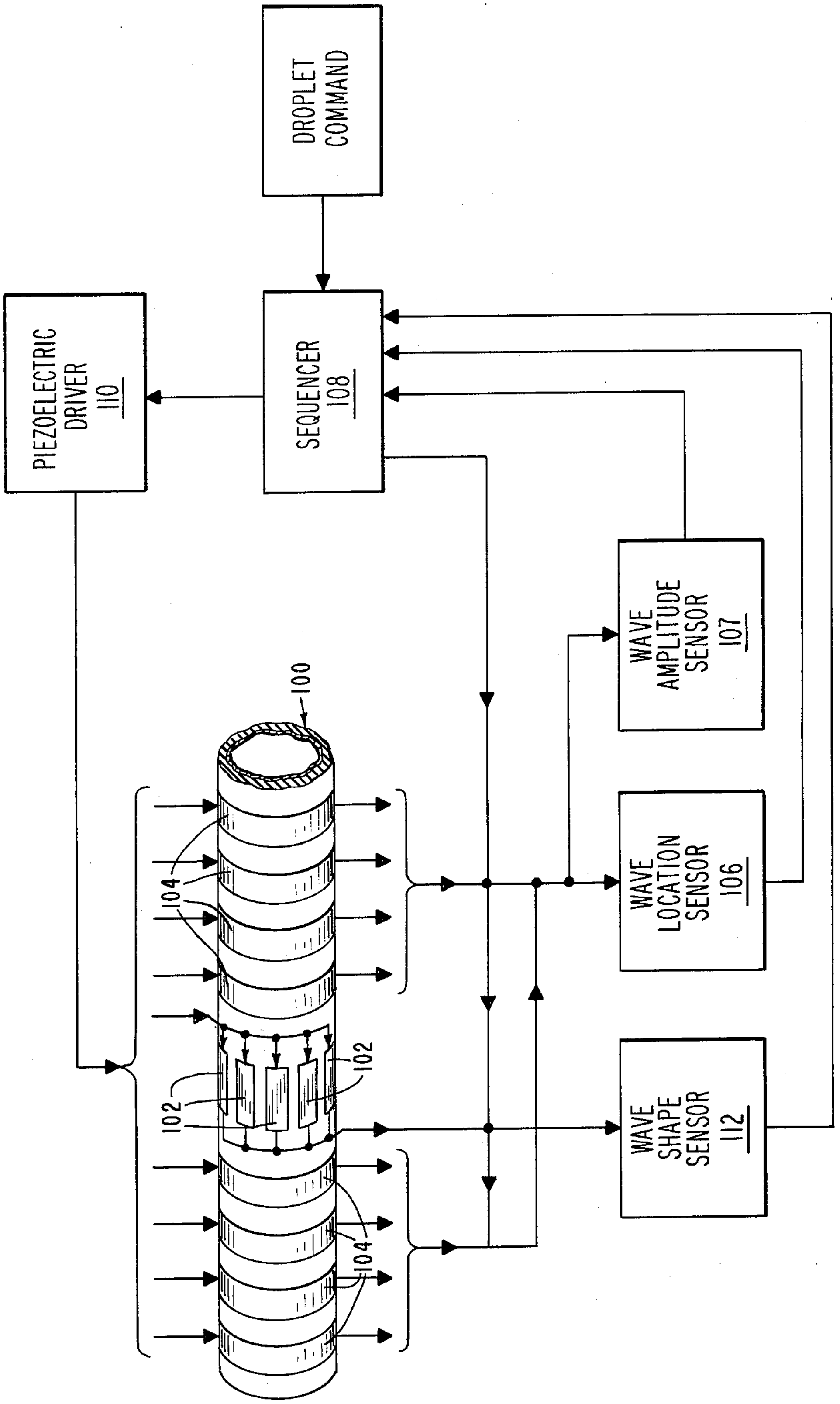

A further object of the present invention is the provision of an ink jet which eliminates mechanical discontinuities in the ink path, e.g., which eliminates sharp corpiezoelectric member of the present invention showing, in greatly exaggerated scale, the destructive and constructing effects of selective sequenced activations and of the various piezoelectric bands of said flexible member; and FIG. 6 is a diagram illustrating a plurality of electrode configurations and a preferred system for creating, sensing and controlling pressure waves within a fragmentary portion of a flexible piezoelectric member.

DETAILED DESCRIPTION OF PREFERRED EMBODIMENTS

Figure 1:
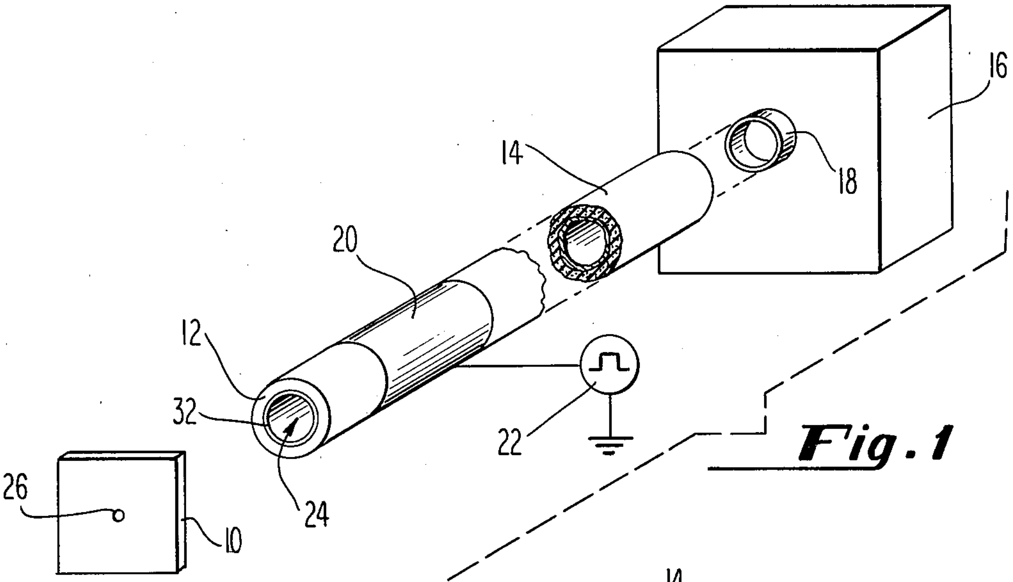
FIG. 1 is an exploded perspective view of an ink jet apparatus representing a preferred embodiment of the invention.

Referring to FIG. 1, an ink jet is shown comprising an orifice plate 10 adapted to be secured to a face 12 of a tubular member 14 which is coupled to an ink supply 16 at a flange 18. The tubular member 14 carries a conductive coating 20 on the exterior surface thereof which is energized by a suitable source of pulses 22. The interior of the member 14 comprises an elongated chamber 24 which is in communication with the ink supply 16 and an orifice 26 in the plate 10.

In accordance with this invention, the tubular member 14 is characterized by substantial elasticity. It is further characterized by sufficient electromecanical transducer properties so as to permit the volume of the chamber 24 to contract and expand to the point that contraction of the chamber 24 results in the projection of a droplet through the orifice 26 in response to pulses from the pulse supply 22.

In order to achieve the above-described transducer and elastic properties, the tubular member 14 in the preferred embodiment comprises a substantially uniformly dispersed or homoeneous mixture of piezoelectric crystals and an elastic binder. In the particularly preferred embodiment of the invention, the piezoelectric crystals may comprise PZT powder and the elastic binder may comprise neoprene rubber. Presently, the NTK TM "piezorubber" materials referred to above are the best commercially available materials known for use in said tubular member. In addition, 5 to 15 parts of a plasticizer such as styrene or asphalt may be added with 1 to 3 parts of sulfur. In a particularly preferred embodiment, 900 parts of PZT powder may be mixed with 10 parts plasticizer and 2 parts sulfur. This mixture may then be formed into the tubular member 14, vulcanized and subjected to an electric field so as to properly polarize the piezoelectric crystals. The coating 20 may then be applied to the member 14. In addition, the interior of the tubular member 14 may be coated.

It will be appreciated that the orifice 26 is relatively small as compared with the internal diameter of the member 14. In particular, it is preferred that the maximum cross-sectional dimension, e.g., the diameter, be not more than 4 mils and preferably not less than 1 mil.

Figure 2:
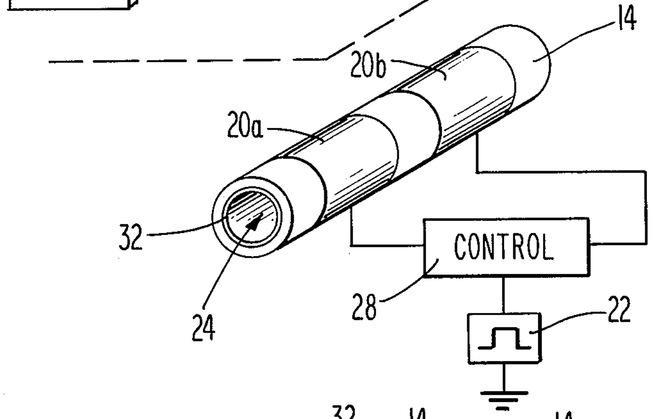
FIG. 2 is a perspective view representing another embodiment of the invention.

Referring now to the embodiment of FIG. 2, the tubular member 14 is shown coated with a pair of axially displaced ring-like coatings **20*a* and 20*b*. The coatings 20*a* and 20*b* may be selectively and sequentially energized by the source 22 by means of a control circuit 28. This allows a pressure wave to be produced within the chamber 24 which moves from the supply 16 toward the orifice 26 (not shown in FIG. 2**).

Figure 3:
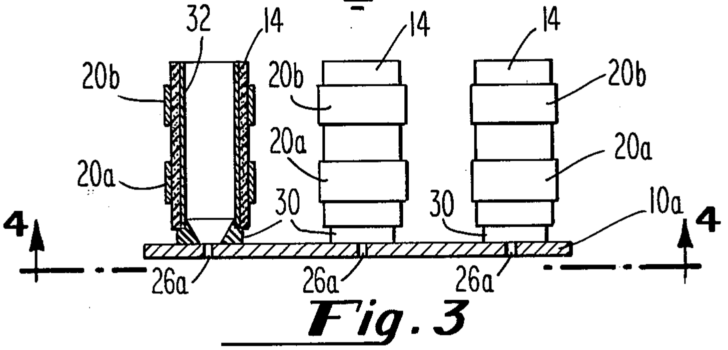
FIG. 3 is a partially sectioned view of a plurality of the ink jets shown in FIG. 2 assembled in an array.

Referring now to FIG. 3, an ink jet array comprising the jets of FIG. 2 is shown. An orifice plate **10*a* comprising a plurality of orifices 26*a* is sealed to the plurality of tubular members 14 shown in FIG. 3. This sealing is accomplished by sealing rings 30 perhaps best shown in the lefthandmost jet of FIG. 3. It will be noted that the sealing ring 30 tapers inwardly toward the orifice 26*a* so as to prevent any sharp corners within the jet which could produce bubbles. The lefthandmost jet in FIG. 3 also clearly shows the use of an interior conductive coating 32** although such a coating may be eliminated if the ink utilized in the jet is highly conductive.

Figure 4:
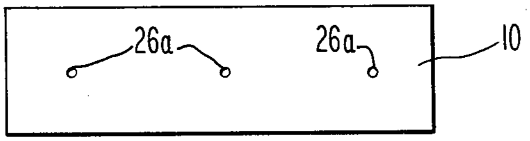
FIG. 4 is a plan view of an orifice plate taken along line 4—4 of FIG. 3.

As shown in FIG. 4, the orifices **26*a* are substantially spaced in the plate 10*a*. However, it will be appreciated that jets 14 may be more closely packed to achieve a denser array. Moreover, the jets 14** may be staggered in two or more tiers so as to achieve a relatively dense two dimensional array.

In accordance with the preferred embodiment of the present invention, more than two distinct electrode coatings may be applied to the surface of the chamber 24. In FIG. 6, a flexible member section, designated generally 100, having a plurality of radially disposed electrode coatings 102 and annular, axially disposed electrode coatings 104 is illustrated. One of ordinary skill in the art will appreciate that these distinct coatings need not be disposed in the particular geometric patterns shown in FIG. 6. Such coatings may be interposed with respect to each other and appropriately configured in other patterns provided they may accomplish the sensing and activating functions described hereinafter. In accordance with this embodiment, waves are generated through the application of voltages to sequences of electrodes 104 and/or 102 which activate and cause contractions in respective portions of such members in the vicinity of such activated bands. It is anticipated that such bands will have dimensions in the appropriate axis which are no greater than about one-half of the shortest wave length to be produced or sensed within the chamber. Accordingly, it is anticipated that at least no more than alternate ones of said bands needed to be activated in order to create a wave of the appropriate frequency. Since a piezoelectric material, when subjected to pressure, will generate a voltage, sequences of electrodes 102 and 104 are monitored in means 106 wave location and amplitude sensing means 107. Sequencer 108 ensures that the location and amplitude of waves are sensed utilizing those electrode bands which are not being activated by the piezoelectric driver 110 which is similar controlled by sequencer 108.

The annular, axial positioning of bands 104 (shown in FIG. 6) is particularly suited to sensing the location of peaks of such waves as they moved axially along said chamber.

Due to the flexible nature of the compression chamber of the present invention, it is anticipated that compression waves generated therein may not be entirely round. Such asymmetry may result from irregularities in the elasticity of the walls of the flexible member, and/or heterogeneities within the fluid to be jetted. Radially disposed electrode coating portions 102 are accordingly provided for the purpose of sensing and correcting an asymmetry in wave roundness. Sensing means 112 is thus provided which is coupled with sequencer 108 and which provides information to the piezoelectric drive to appropriately activate those portions of the electrode surfaces 102 which should be contracted in order to correct asymmetries in the wave pattern.

Figure 5:
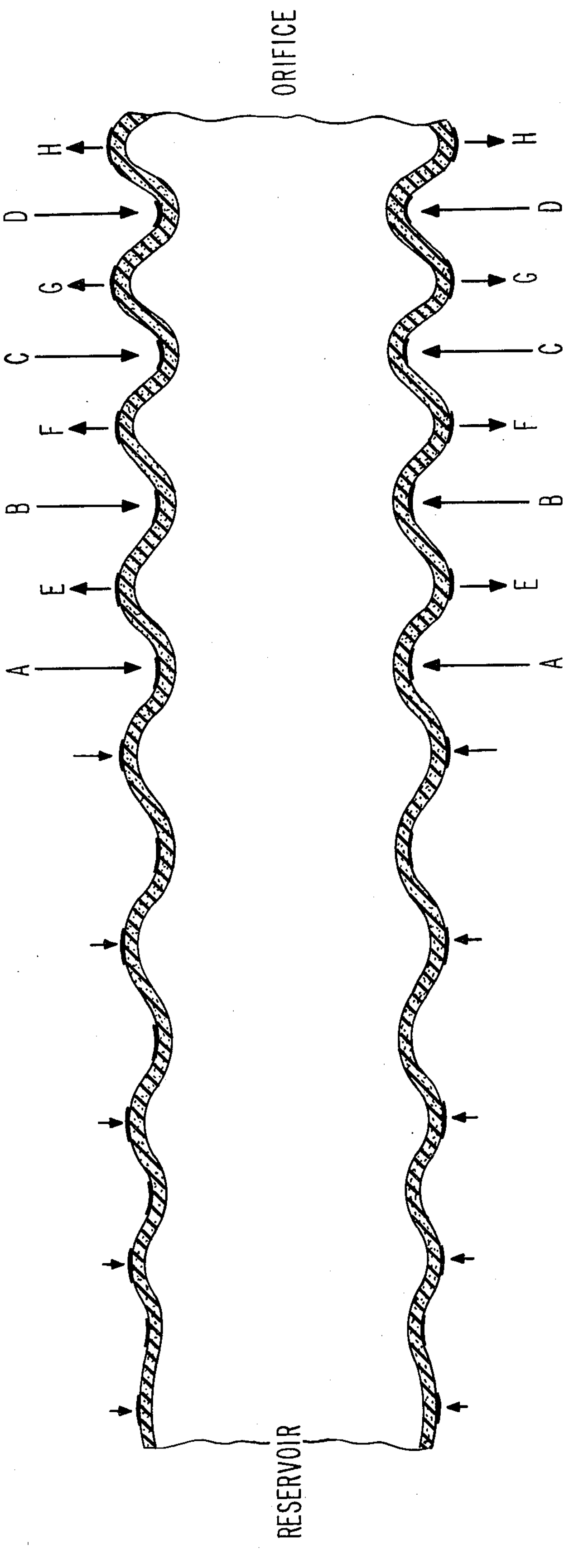
FIG. 5 is a greatly enlarged diagramatic cross section of one of the walls of the preferred embodiment flexible

In FIG. 5, a theoretical preferred wave form of the flexible member is diagramatically illustrated by greatly exaggerating the wave pattern which will be formed in a cross ection of one of the walls of the flexible members.

Although a specific configuration for the member 14 has been described, i.e., tubular, it will be appreciated that other shapes may be utilized. For example, a substantially planar member characterized by the necessary elasticity and piezoelectric properties may be utilized where the planar member forms part of the chamber and is in direct contact with the ink. In this regard it will be appreciated that it is particularly important that the member, regardless of shape, be inert with respect to the ink.

It will also be appreciated that various materials may be utilized to achieve the above mentioned piezoelectric characteristics. For example, mixtures of lead oxide titanium oxide, zinconium oxide, lentharium oxide and quartz may be utilized. Moreover, various elastic binders may be utilized other than neoprene rubber. For example, polyisoprene, polypropylene, PVC and natural rubber may be utilized.

Although presently less preferred, the tubular member 14 may alternatively be composed of an elastomeric binder containing dispersed magnetostrictive particles, such as nickel. In such instances, segmented magnetic fields may be utilized to cause selective constrictions in the tubular member 14 in a manner similar to that described for the above mentioned piezoelectric tubular member.

Although particularly preferred embodiments of the invention have been shown and described, other embodiments will occur to those of ordinary skill in the art that fall within the true spirit and scope of the invention, as set forth in the appended claims.

What is claimed is:

1. An ink jet apparatus comprising:

an elastic tubular member forming, at least in part, a chamber for receiving ink, said tubular member comprising piezoelectric crystals substantially uniformly dispersed through said member and having electromechanical transducer properties;

an orifice in said chamber adapted to pass droplets of ink;

means for supplying ink to said chamber; and means for relatively energizing said tubular member so as to contract and expand said chamber, said orifice projecting droplets outwardly therefrom when said chamber contracts.

2. The apparatus of claim 1 wherein said member comprises a conductive coating on the exterior thereof outside of said chamber.

3. The apparatus of claim 1 wherein said member further comprises a conductive coating on the interior thereof inside said chamber.

4. The apparatus of claim 1 wherein said member comprises a plurality of conductive coatings electrically isolated on the surface of said member.

5. An ink jet apparatus comprising:

an elastic tubular member forming, at least in part, a chamber for receiving ink, said tubular member comprising rubber and piezoelectric crystals substantially uniformly dispersed through said member and having electromechanical transducer properties;

an orifice in said chamber adapted to pass droplets of ink;

means for supplying ink to said chamber; and means for relatively energizing said tubular member so as to contract and expand said chamber, said orifice projecting droplets outwardly therefrom when said chamber contracts.

6. An ink jet apparatus comprising:

an elastic tubular member forming, at least in part, a chamber for receiving ink, said tubular member having electromechanical transducer properties;

a plurality of conductive coatings electrically isolated on the surface of said member;

an orifice in said chamber adapted to pass droplets of ink;

means for supplying ink to said chamber; and means for relatively energizing said tubular member so as to contract and expand said chamber, said means for relatively energizing including means for sequentially energizing said flexible member at said plurality of coatings for creating a pressure wave through said chamber to project droplets outwardly from said orifice.

7. The apparatus of claim 6 further comprising means for sensing the location of said pressure wave within said chamber.

8. The apparatus of claim 6 further comprising means for sensing the amplitude of said pressure wave within said chamber.

9. The apparatus of claim 6 further comprising means for sensing the shape of said pressure wave within said chamber.

10. The apparatus of claim 6 wherein said plurality of coatings alternatively may cause the contraction of said flexible member and sense the degree of expansion of said flexible member.

11. An ink jet comprising:

a member comprising a substantially homogeneous mixture of piezoelectric material and an elastic binder, said member forming at least in part a chamber adapted to receive ink; and an orifice in said chamber having a maximum dimension not more than 4 mils nor less than 1 mil so as to permit the projection of ink droplets therethrough.

12. The ink jet of claim 11 further comprising a conductive coating on the exterior of said member outside said chamber.

13. The ink jet of claim 11 wherein said member is tubular so as to form said chamber within.

14. An ink jet comprising:

a member comprising a substantially homogeneous mixture of piezoelectric material and an elastic binder, said member forming at least in part a chamber adapted to receive ink, an orifice in said chamber having a maximum dimension not more than 4 mils nor less than 1 mil so as to permit the projection of ink droplets therethrough; and means for relatively energizing said tubular member so as to contract and expand said chamber, said means further comprising a plurality of conductive coatings on the exterior of said member outside said chamber, said coatings being mutually electrically separated on said exterior.

15. The ink jet of claim 14 wherein said coatings are mutually electrically spaced along said member.

16. The method of operating an ink jet including an elastic member comprising a substantially homogeneous mixture of piezoelectric material and elastic binder, said member forming at least in part an ink receiving chamber having an orifice therein, said method comprising the following steps:

supplying ink to said chamber;

electrically energizing said member so as to alter the volume of said chamber; and projecting a droplet of ink in response to a change in the volume of said member.

17. The method of claim 16 further comprising the step of sequentially energizing said member at different locations to create a pressure wave through said member.

* * * * *